(12) United States Patent
Mruk et al.

(10) Patent No.: US 8,418,737 B2
(45) Date of Patent: Apr. 16, 2013

(54) TIRE WITH COMPONENT CONTAINING POLYBENZOBISOXAZOLE SHORT FIBER AND EPOXIDIZED POLYISOPRENE

(75) Inventors: Ralf Mruk, Grand Duchy (LU); Serge Julien Auguste Imhoff, Grand Duchy (LU); Julia Martine Francoise Claudine Tahon, Bereldange (LU); Annette Lechtenboehmer, Ettelbruck (LU); Frank Schmitz, Grand Duchy (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/403,089

(22) Filed: Feb. 23, 2012

(65) Prior Publication Data
US 2012/0152424 A1    Jun. 21, 2012

Related U.S. Application Data

(62) Division of application No. 12/266,114, filed on Nov. 6, 2008, now Pat. No. 8,127,815.

(51) Int. Cl.
*B60C 15/00* (2006.01)
(52) U.S. Cl.
USPC ........... 152/539; 152/542; 152/543; 152/541; 152/547; 152/458
(58) Field of Classification Search .................. 152/542, 152/543, 541, 547, 539, 458
See application file for complete search history.

(56) References Cited

U.S. PATENT DOCUMENTS

| | | | |
|---|---|---|---|
| 5,948,186 A | 9/1999 | Yabuki | 152/527 |
| 5,976,447 A | 11/1999 | Mills et al. | 264/344 |
| 6,824,871 B2 | 11/2004 | Chu | 428/395 |
| 6,866,922 B2 | 3/2005 | Takehara et al. | 428/295.1 |
| 6,875,144 B2 | 4/2005 | Kinoshita et al. | 474/260 |
| 7,138,450 B2 * | 11/2006 | Wentworth et al. | 524/284 |
| 2003/0000619 A1 * | 1/2003 | Nakamura et al. | 152/525 |
| 2007/0044882 A1 | 3/2007 | Cowger et al. | 152/458 |
| 2007/0254988 A1 | 11/2007 | Gajiwala et al. | 524/31 |
| 2008/0090967 A1 * | 4/2008 | Dailey | 525/139 |
| 2009/0151840 A1 * | 6/2009 | Lechtenboehmer et al. | 152/458 |

FOREIGN PATENT DOCUMENTS

| | | |
|---|---|---|
| EP | 329589 | 2/1989 |
| EP | 965465 | 6/1999 |
| EP | 1454765 | 2/2004 |
| JP | 54093501 | * 7/1976 |
| JP | 54093501 | 7/1979 |
| JP | 6286408 | 10/1994 |

(Continued)

*Primary Examiner* — Joseph S Del Sole
*Assistant Examiner* — David N Brown, II
(74) *Attorney, Agent, or Firm* — John D. DeLong

(57) ABSTRACT

The present invention is directed to a pneumatic tire comprising at least one component selected from the group consisting of apexes, flippers and chippers, the at least one component comprising a rubber composition, the rubber composition comprising a diene based elastomer and from 1 to 30 parts by weight, per 100 parts by weight of elastomer (phr), of a polybenzobisoxazole (PBO) short fiber having a length ranging from 0.5 to 20 mm having a thickness ranging from 10 to 30 microns, and from 1 to 50 phr of an epoxidized polyisoprene having a number-average molecular weight of 5000 to 100000.

10 Claims, 3 Drawing Sheets

| | FOREIGN PATENT DOCUMENTS | | JP | 2007191677 | 8/2007 |
|---|---|---|---|---|---|
| JP | 6286426 | 10/1994 | JP | 2007246808 | 9/2007 |
| JP | 07082420 | * 3/1995 | | | |
| JP | 7082420 | 3/1995 | * cited by examiner | | |

TIRE WITH COMPONENT CONTAINING POLYBENZOBISOXAZOLE SHORT FIBER AND EPOXIDIZED POLYISOPRENE

This application is a division of Ser. No. 12/266,114 filed Nov. 6, 2008, now U.S. Pat. No. 8,127,815.

BACKGROUND OF THE INVENTION

A tire is a composite of several components each serving a specific and unique function yet all synergistically functioning to produce the desired performance. One important component is the carcass ply. The carcass ply is a continuous layer of rubber-coated parallel cords which extends from bead to bead and functions as a reinforcing element of the tire. The ply is turned-up around the bead, thereby locking the bead into the assembly or carcass. In the immediate proximity of the carcass ply turn-up is an apex. The apex includes a rubber wedge located in the lower sidewall region above the bead and is bonded to and encased by the carcass plies. The apex also includes the area located between the lower sidewall rubber and the axially outer side of the carcass ply turn-up. Between the bead and apex, a flipper may be included, and between the carcass ply and chafer, a chipper may be included. The apex serves to stiffen the area near the bead in the lower sidewall. The flipper serves as an interface between the bead and carcass ply, to prevent erosion of the carcass ply and/or bead due to interfacial stresses. The chipper serves as an interface between the carcass ply and the rubber chafer contacting the wheel rim.

The apex, flipper and chipper performance may improve when reinforced with short fibers having a specific orientation. For example, an apex with radially oriented fibers may improve the bending stiffness of the lower sidewall of the tire. Known techniques for orienting reinforcing short fibers in an elastomeric material are generally methods for orienting fibers in a composite in a direction which is consistent with and parallel to the material flow direction in processing equipment. However, such fiber orientation is often difficult to achieve in practice due to poor dispersion and/or adhesion of the fibers to the rubber. There is, therefore, a need for an improved apex, flipper, or chipper with oriented short fibers.

SUMMARY OF THE INVENTION

The present invention is directed to a pneumatic tire comprising at least one component selected from the group consisting of apexes, flippers and chippers, the at least one component comprising a rubber composition, the rubber composition comprising a diene based elastomer and from 1 to 30 parts by weight, per 100 parts by weight of elastomer (phr), of a polybenzobisoxazole (PBO) short fiber having a length ranging from 0.5 to 20 mm having a thickness ranging from 10 to 30 microns, and from 1 to 50 phr of an epoxidized polyisoprene having a number-average molecular weight of 5000 to 100000.

DETAILED DESCRIPTION OF THE INVENTION

Figure 1:
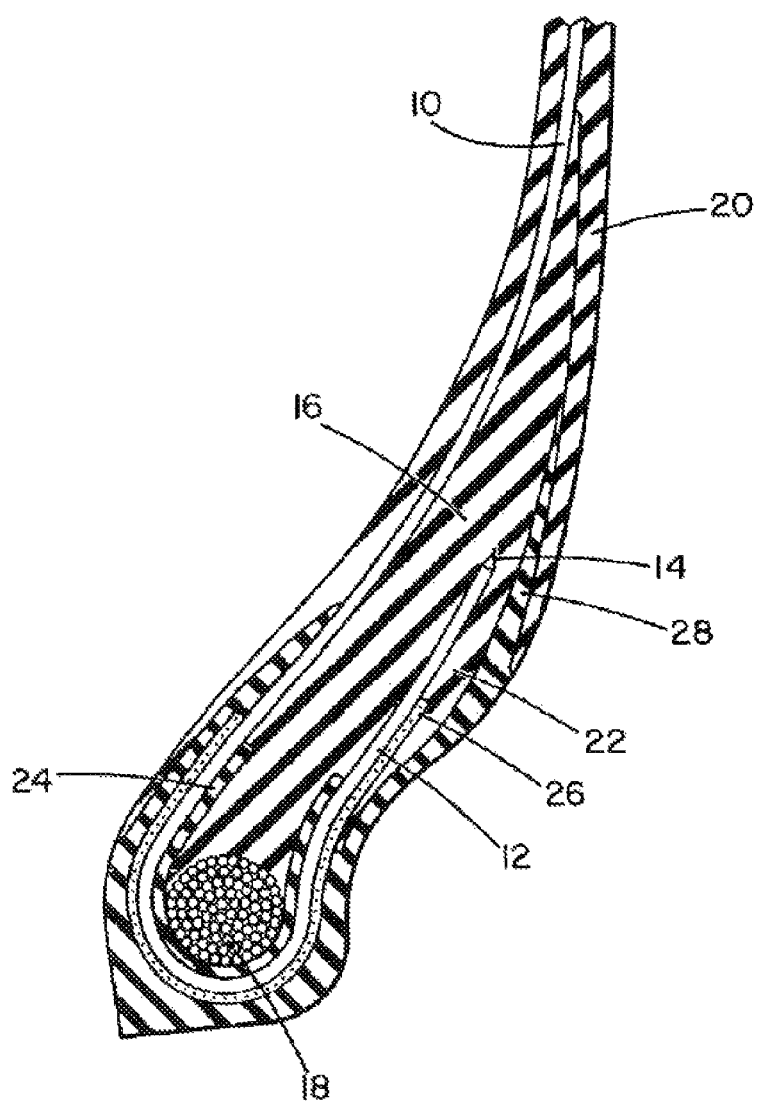
FIG. 1 shows a cross-section of a portion of a tire according to one embodiment of the present invention.

There is disclosed a pneumatic tire comprising at least one component, the at least one component comprising a rubber composition, the rubber composition comprising a diene based elastomer, from 1 to 30 parts by weight, per 100 parts by weight of elastomer (phr), of a polybenzobisoxazole short fiber having a length ranging from 0.5 to 20 mm having a thickness ranging from 10 to 30 microns, and from 1 to 50 phr of an epoxidized polyisoprene.

The rubber composition includes a polybenzobisoxazole short fiber. In one embodiment, suitable polybenzobisoxazole fiber is produced by methods as taught for example in U.S. Pat. No. 5,976,447, the teachings of both of which are fully incorporated herein by reference. After production of polymeric fiber, the fiber may be cut to the desired length by methods as are known in the art.

Suitable polybenzobisoxazole fibers can be produced as disclosed in U.S. Pat. No. 5,976,447. As taught therein, fibers prepared from polybenzobisoxazole (PBO) may be prepared by first extruding a solution of polybenzobisoxazole polymer in a mineral acid (a polymer "dope") through a die or spinneret to prepare a dope filament. The dope filament is then drawn across an air gap, washed in a bath comprising water or a mixture of water and a mineral acid, and then dried. If multiple filaments are extruded simultaneously, they may then be combined into a multifilament fiber before, during, or after the washing step. The wound long fiber may then be cut to the desired short lengths using methods as are known in the art.

In one embodiment, the PBO fiber may be treated with an adhesive composition to improve the adhesion of the PBO short fiber to rubber. For example and in one embodiment, prior to cutting the long PBO fiber to the desired short lengths, the long fiber may be dipped in a conventional RFL type treatment. In one embodiment and as taught in U.S. Pat. No. 6,824,871, wherein PBO yarn or cord is coated with a mixture of an epoxy resin with a vinyl pyridine-styrene-butadiene rubber latex (VPSBRL), the mixture referred to as a "subcoat"; the subcoated cord is then again coated by dipping in a conventional reaction product of a phenolic compound, an aldehyde donor and a latex, familiarly referred to generically as a "resorcinol-formaldehyde latex (RFL)"; and, (B) to a PBO-finishing process to make twice-coated yarn, in which process the epoxy-latex mixture is applied to PBO yarn which may have been given a spin-finish, or corona, or plasma treatment, yielding subcoated PBO yarn; and, the subcoated yarn is then again coated by dipping in a conventional RFL dip.

In one embodiment, the polybenzobisoxazole short fiber has an average length of from 0.5 to 20 mm. In one embodiment, the polybenzobisoxazole short fiber has an average length of from 1 to 10 mm. In one embodiment, the polybenzobisoxazole short fiber has an average thickness of from 10 to 30 microns. In one embodiment, the polybenzobisoxazole short fiber has an average thickness of from 10 to 20 microns. In one embodiment, the polybenzobisoxazole short fiber has a weight of from 0.5 to 5 decitex.

Suitable PBO fiber is available commercially as Zylon® from Toyobo.

In one embodiment, the polybenzobisoxazole short fiber is present in the rubber composition in a concentration ranging from 1 to 30 parts by weight per 100 parts by weight of diene based elastomer (phr). In another embodiment, the polybenzobisoxazole short fiber is present in the rubber composition in a concentration ranging from 5 to 15 parts by weight per 100 parts by weight of diene based elastomer (phr).

The rubber composition also includes an epoxidized polyisoprene. In one embodiment, the epoxidized polyisoprene may be as described in U.S. 2006/0189720. As described therein, epoxidized polyisoprene in the present specification are obtained by epoxidizing carbon-carbon double bonds in polyisoprene. The epoxidized polyisoprene has a number-average molecular weight of 5000 to 100000, preferably 15000 to 70000, more preferably 20000 to 40000.

As used herein, the number-average molecular weight is in terms of polystyrene according to gel permeation chromatography (GPC).

There is particularly no limitation on the process for producing epoxidized polyisoprene. For example, anionic polymerization can be used. The anionic polymerization may be performed in an inert gas atmosphere such as argon or nitrogen, in a solvent inactive in the polymerization such as hexane, cyclohexane, benzene or toluene, with use of an initiator such as an alkali metal (e.g., metallic sodium or metallic lithium) or an alkyllithium compound (e.g., methyllithium, ethyllithium, n-butyllithium or s-butyllithium), at a polymerization temperature of −100 to 100° C., and over a period of 0.01 to 200 hours.

Subsequently, the polyisoprene obtained is epoxidized at a carbon-carbon double bond to give an epoxidized polyisoprene The process of epoxidation is not particularly limited, and exemplary processes include (i) treatment with a peracid such as peracetic acid, (ii) treatment with a molybdenum complex and t-butylhydroperoxide, (iii) treatment with a tungstic acid catalyst and hydrogen peroxide, and (iv) treatment with a tungsten compound selected from ammonium tungstate and phosphotungstic acid, a quaternary ammonium salt, phosphoric acid, and an aqueous hydrogen peroxide solution.

A part to be epoxidized is not particularly limited. Epoxy groups may be introduced into random parts in a diene rubber molecular chain or particular parts of the diene rubber, e.g. carbon-carbon double bond parts derived from isoprene may be selectively epoxidized.

The epoxy group content of the epoxidized polyisoprene is not strictly limited. In general, it is preferably in the range of 0.1 to 15 meq/g, more preferably 0.3 to 10 meq/g.

In one embodiment, the rubber composition comprises from 1 to 30 phr of epoxidized polyisoprene. In one embodiment, the rubber composition comprises from 5 to 15 phr of epoxidized polyisoprene.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis* & *Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

   III in which Z is selected from the group consisting of

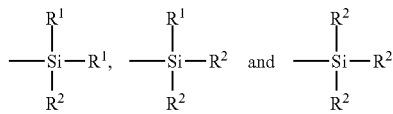

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula III, Z may be

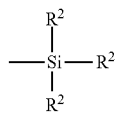

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition is milled, calendared or extruded to form the apex, flipper, or chipper. The formed component will have the short fibers with an orientation in the direction of processing, that is, a substantial portion of the fibers will generally be oriented in a direction which is consistent with and parallel to the material flow direction in the processing equipment. The rubber composition will have a degree of anisotropy, that is, a modulus measured in a direction consistent with the processing direction will be greater than that measured in a direction perpendicular to the processing direction. The rubber composition is incorporated into an apex, flipper or chipper.

With reference now to FIG. 1, a tire according to the invention contains a carcass ply 10 with a turn-up portion 12 and a terminal end 14. The apex 16 is in the immediate proximity of the carcass ply turn-up 14 including the area above the bead 18 and is encased by the carcass ply 10 and carcass ply turn-up 12 or sidewall compound 20. The apex also includes the area 22 located between the lower sidewall 20 and the axially outer side of the carcass ply turn-up 12. The interface between the bead 18 and the carcass ply 10 is a flipper 24. Located outside of the carcass ply 10 and extending in an essentially parallel relationship to the carcass ply 10 is the chipper 26. Located around the outside of the bead 18 is the chafer 28 to protect the carcass ply 12 from the rim (not shown), distribute flexing above the rim, and seal the tire. At least one of apex 16, flipper 24, or chipper 26 comprises the rubber composition as described herein.

In one embodiment, the component is a flipper. In prior art applications, a flipper typically comprises textile cord. In such a flipper application, the cord cannot be oriented in a zero degree radial direction to the radial direction of the tire, due to the increase in radius experienced at the bead during tire build. Typically then, the cords are placed at a 45 degree angle with respect to the radial direction of the tire, to allow for the radius increase and deformation of the flipper during tire build; see for example, U.S. Pat. No. 6,659,148. By contrast, a with the short fiber composition of the present invention, the flipper may be constructed such that the short fibers may be oriented at zero degrees with respect to the radial direction of the tire. This is desirable to provide additional support at the bead to counteract the directional stresses experienced at the bead. Thus, the flipper of the present invention is not restricted from a zero degree orientation, but may in one embodiment exist with the short fibers substantially oriented in an angle ranging from 0 to 90 degrees with respect to the radial direction of the tire. By substantially oriented, it is meant that the flipper compound is disposed such that with regard to the dimension of the flipper corresponding to that parallel to the direction of propagation through the flipper's fabrication process (i.e. calendar or extruded), that dimension may be oriented at an angle ranging from 0 to 90 degrees with respect to the radial direction of the tire. In another embodiment, the flipper may be disposed with the fibers oriented at an angle ranging from 0 to 45 degrees with respect to the radial direction of the tire. In another embodiment, the flipper may be disposed with the fibers oriented at an angle ranging from 0 to 20 degrees with respect to the radial direction of the tire. In another embodiment, the flipper may be disposed with the fibers oriented at an angle ranging from 0 to 10 degrees with respect to the radial direction of the tire.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, the effect of adding a polybenzobixoxazole short fiber to a rubber composition according to the present invention is illustrated. Rubber compositions containing diene based elastomer, fillers, process aids, anti-degradants, and curatives were prepared following recipes as shown in Table 1, with all amounts given in parts by weight per 100 parts by weight of base elastomer (phr). Sample 1 contained no short fiber and served as a control. Sample 2 and 3 included short fiber but no polar adhesion promoter and are comparative. Samples 4 and 5 included short fiber and polar adhesion promoters and are representative of the present invention. Cured samples were tested for physical properties, given in Table 2.

TABLE 1

| Sample No. | 1 | 2 | 3 | 4 |
|---|---|---|---|---|
| Natural Rubber | 100 | 100 | 100 | 100 |
| Carbon Black | 46 | 36 | 30 | 36 |
| Silica | 0 | 0 | 8 | 0 |
| PBO fibers[1] | 0 | 8.6 | 8.6 | 8.6 |
| Resorcinol | 1.8 | 1.8 | 1.8 | 1.8 |
| Process Oil[2] | 6.5 | 6.5 | 6.5 | 0 |
| Epoxidized LIR[3] | 0 | 0 | 0 | 6.5 |
| Stearic Acid | 3 | 3 | 3 | 3 |
| Antidegradants[4] | 0.85 | 0.85 | 0.85 | 0.85 |
| HMTA[5] | 1.3 | 1.3 | 1.3 | 1.3 |
| Oiled sulfur | 0.9 | 0.9 | 0.9 | 0.9 |
| Zinc Oxide | 7.5 | 7.5 | 7.5 | 7.5 |
| Sulfur | 1.4 | 1.4 | 1.4 | 1.4 |
| Accelerator[6] | 1.1 | 1.1 | 1.1 | 1.1 |
| Retarder[7] | 0.2 | 0.2 | 0.2 | 0.2 |

[1]Polybenzobisoxazole fiber, Zylon ® from Toyobo, 3 mm length, 12 micron diameter
[2]Low polycyclic aromatic oil, low viscosity
[3]KL630 with molecular weight of 29000 and 1.5 meq/g epoxy groups, from Kuraray
[4]p-phenylene diamine and quinoline types
[5]Hexamethylenetetramine
[6]sulfenamide type
[7]phthalimide type

TABLE 2

| Sample No. | 1 | 2 | 3 | 4 |
|---|---|---|---|---|
| Tear Strength | | | | |
| Cure: 18 Min @ 150° C.; Test: @ 100 c, Pulling Speed = 50 cm/min, Adhesion To = Itself | | | | |
| Tear Strength, N/mm | 13.3 | 5.8 | 6.7 | 5.1 |
| Cold Tensile D53504 | | | | |
| Cure: 18 Min @ 150° C.; | | | | |
| Test: Parallel to fiber direction; | | | | |
| Test: @ 23° C., Pulling Speed = 20 cm/min | | | | |
| Elongation At Break, % | 479.7 | 359.9 | 383.2 | 342.8 |
| 100% Modulus, Mpa | 3.4 | 7.5 | 7.5 | 8.0 |
| 200% Modulus, Mpa | 8.8 | 9.4 | 8.6 | 10.2 |
| 300% Modulus, Mpa | 15.9 | 16.0 | 15.7 | 16.9 |
| Tensile Strength, Mpa | 29.6 | 20.4 | 21.7 | 19.7 |
| Cold Tensile D53504 | | | | |
| Cure: 18 Min @ 150° C.; | | | | |
| Test; Perpendicular to fiber direction; | | | | |
| Test: @ 23° C., Pulling Speed = 20 cm/min | | | | |
| Elongation At Break, % | 480.6 | 334.1 | 351.7 | 326.5 |
| 100% Modulus, Mpa | 3.1 | 3.9 | 3.9 | 4.0 |
| 200% Modulus, Mpa | 7.9 | 7.1 | 7.0 | 7.5 |
| 300% Modulus, Mpa | 14.9 | 12.7 | 12.5 | 13.4 |
| Tensile Strength, Mpa | 28.9 | 14.8 | 15.7 | 15.0 |
| Ring Modulus | | | | |
| Cure: 18 @ 150° C.; Test: @ 23° C., Pulling Speed = 50 cm/min | | | | |
| Elongation At Break, % | 471.1 | 310.9 | 351.5 | 344.8 |
| 100% Modulus, Mpa | 3.1 | 6.1 | 5.9 | 6.1 |
| 200% Modulus, Mpa | 8.2 | 9.1 | 8.9 | 9.4 |
| 300% Modulus, Mpa | 15.0 | 14.8 | 14.2 | 15.1 |
| Tensile Strength, Mpa | 23.2 | — | 14.9 | 15.7 |
| MDR 200 Light Tire | | | | |
| Test: @ 150° C. | | | | |
| Minimum torque, dN · m | 2.4 | 2.2 | 2.0 | 2.0 |
| Maximum torque, dN · m | 22.9 | 25.0 | 23.0 | 24.1 |
| Delta torque, dN · m | 20.6 | 22.8 | 20.9 | 22.1 |
| Time To Minimum S' (Mean), Min | 0.3 | 0.4 | 0.4 | 0.3 |
| Time To Maximum S' (Mean), Min | 18.0 | 19.5 | 22.7 | 18.2 |
| T90, Min | 8.6 | 10.5 | 12.6 | 10.1 |
| Reversion 1, Min | 46.4 | 29.3 | 32.5 | 27.4 |
| RPA 2000 | | | | |
| Cured 150° C. | | | | |
| Test: @ 100 c, Frequency = 11 Hz, Strain Sweep | | | | |
| Tan delta, 1% strain | 0.071 | 0.055 | 0.046 | 0.049 |
| Tan delta, 5% strain | 0.113 | 0.087 | 0.075 | 0.075 |
| Tan delta, 10% strain | 0.113 | 0.085 | 0.075 | 0.078 |

Figure 2:
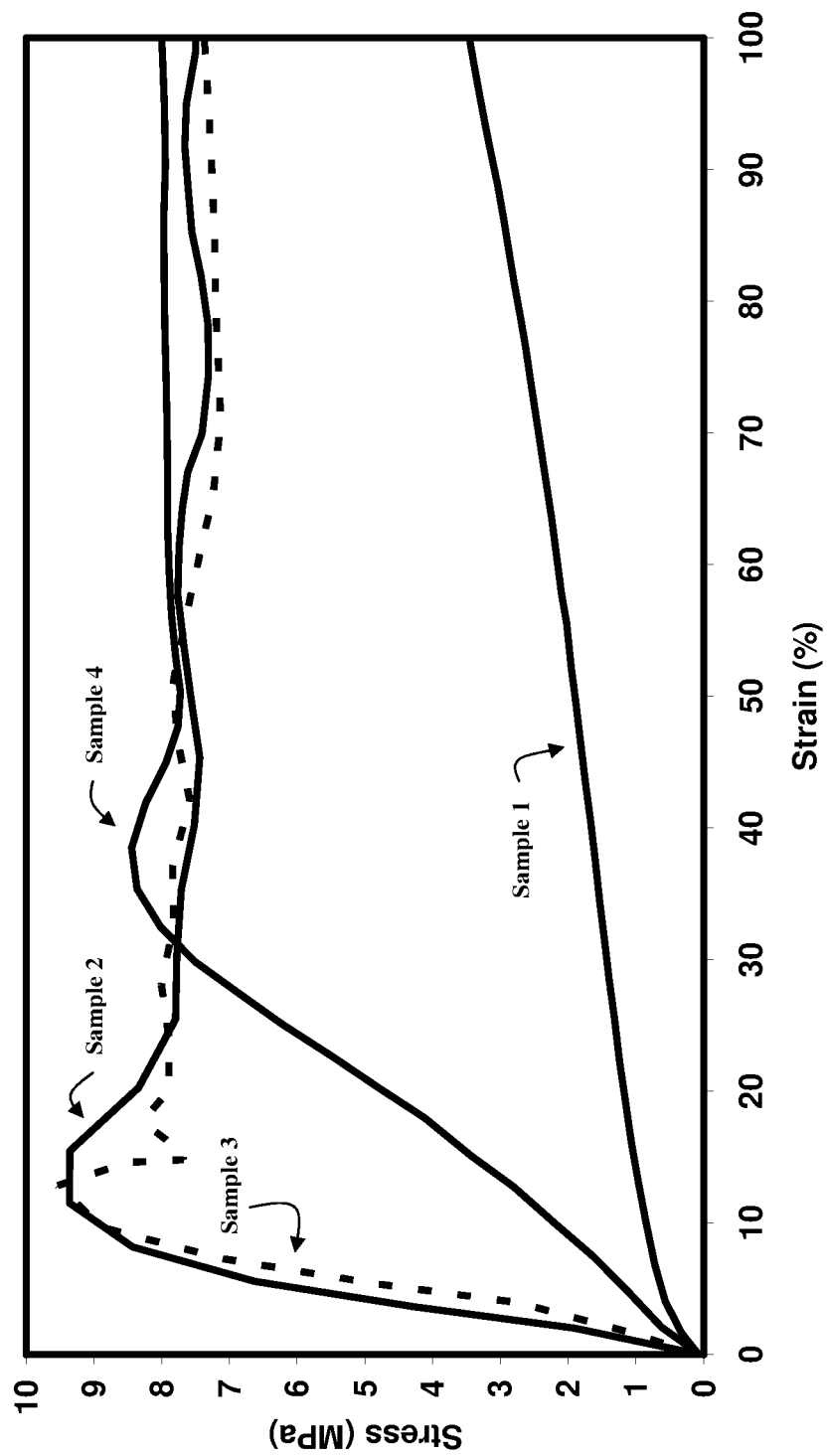
FIG. 2 is a graph of stress vs strain measured for several samples.

Rubber samples were milled into a sheet and cut into tensile test specimens. Tensile test specimens were cut in two orientations, one with the test pulling direction parallel with the milling direction of the specimen, and one with the test pulling direction perpendicular with the milling direction of the specimen. In this way, the effect of fiber orientation (generally in the direction of milling) and thus the anisotropy of the rubber composition was measured. The tensile samples were then measured for stress at various strains. A stress ratio, defined as the (stress measured in the direction parallel to the milling direction)/(stress measured in the direction perpendicular to the milling direction) was then calculated for each strain. The results of stress measured in the direction parallel to the milling direction versus strain are shown in FIG. 2. The results of the stress ratio versus strain are shown in FIG. 3.

Figure 3:
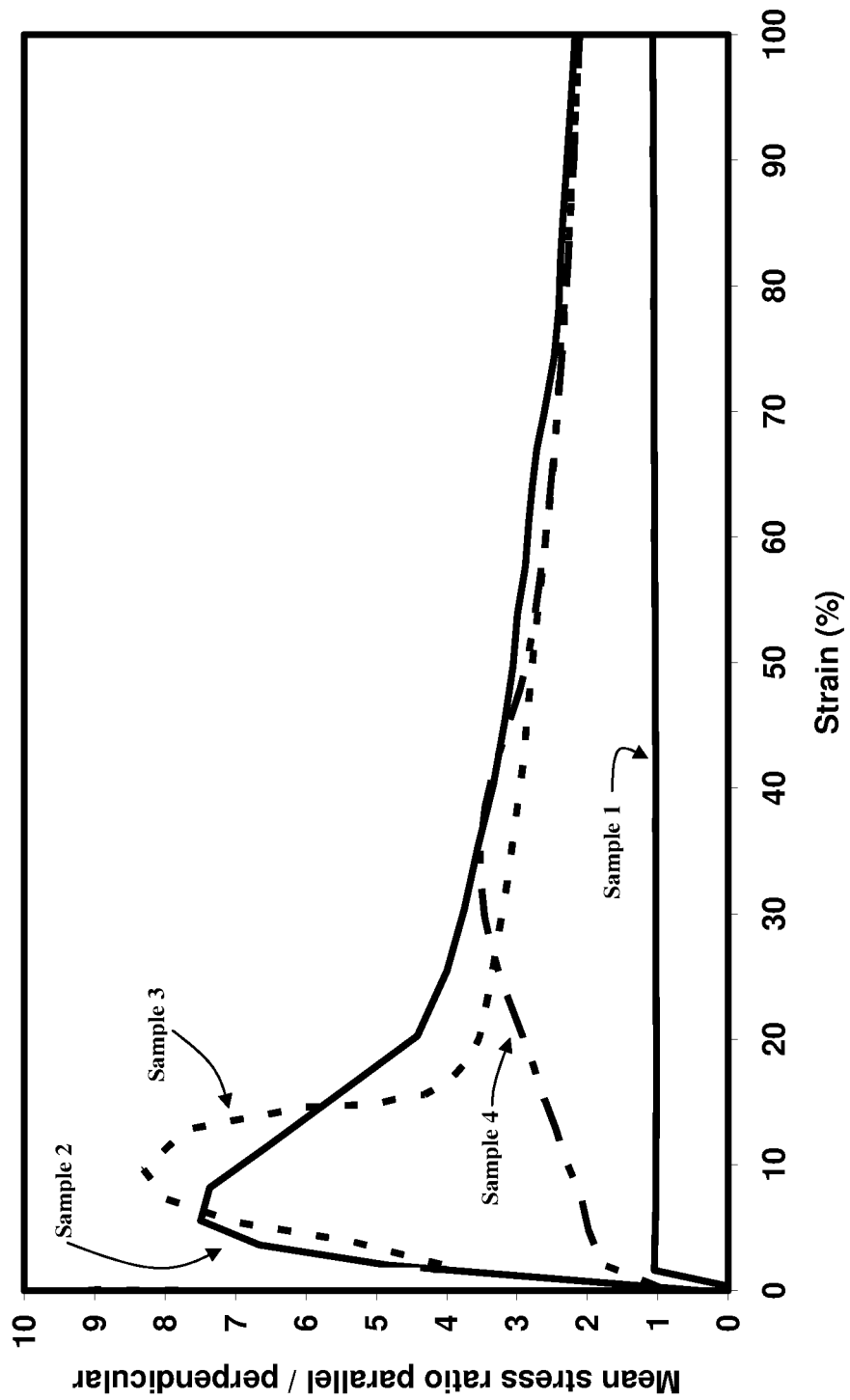
FIG. 3 is a graph of stress ratio vs strain measured for several samples.

As seen in FIG. 3, the stress ratio for Samples 2 and 3 containing the short fibers shows a maximum at about 10 to 15 percent strain, indicating a strong anisotropic reinforcing effect of the fibers in the sample. Such anisotropy is important for applications such as apexes, flippers, and chippers where anisotropic reinforcement is advantageous due to the directional stresses experienced by these tire components at low strains. By comparison, control sample 1 with no fiber shows no such anisotropy. However, a maximum stress at low strain as seen for Samples 2 and 3 indicates interfacial failure between the fiber and rubber matrix at a lower strain than is desirable. Sample 4, containing short fibers and epoxidized polyisoprene, shows a maximum in stress at about 30 to 40 percent strain, much higher than for Samples 2 and 3. The strain at which the peak stress occurs for Sample 4 indicates a better interaction between the fibers and rubber matrix, due to the presence of the epoxidized polyisoprene.

As seen in FIG. 3, the stress ratio for Samples 2 and 3 containing the short fibers shows a maximum at low strain, indicating a strong anisotropic reinforcing effect of the fibers in these samples. However, Sample 4 containing the short fibers and epoxidized polyisoprene shows a peak at higher strain with a much broader yield as compared with Samples 2 and 3, wherein a sharp yield is observed at a lower strain. Such behavior indicates that the inventive Sample 4 demonstrates superior adhesion of the short fibers to the rubber matrix, as illustrated by the broad yield peak at relatively higher strain. By contrast, the sharp yield at relatively lower strain for Samples 2 and 3 demonstrates much poorer adhesion by fibers in Sample 4. Such anisotropy as demonstrated by Sample 4 is important for applications such as apexes, flippers, and chippers where anisotropic reinforcement along with good fiber adhesion is advantageous due to the directional stresses experienced by these tire components at low strains. The superior adhesion and broad yield at low strain for the inventive Sample 4 as compared to Samples 2 and 3 is surprising and unexpected. Typically, short fibers show behavior demonstrated by Samples 2 and 3, with a sharp yield at low strain, indicating poor adhesion and consequent inability to utilize any anisotropy in the compound at strains typically seen in apex, flipper and chipper applications. By contrast, Sample 4 according to the present invention shows much superior adhesion and a broad yield at higher strain, indicating that the compound sample will better perform in an apex, flipper or chipper application. By further comparison, control Sample 1 with no fiber shows no such anisotropy.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a chipper, the chipper comprising a rubber composition, the rubber composition comprising a diene based elastomer and from 1 to 30 parts by weight, per 100 parts by weight of elastomer (phr), of a polybenzobisoxazole (PBO) short fiber having a length ranging from 0.5 to 20 mm having a thickness ranging from 10 to 30 microns, and from 1 to 50 phr of an epoxidized polyisoprene having a number-average molecular weight of 15000 to 70000.

2. The pneumatic tire of claim 1, wherein the epoxidized polyisoprene has an epoxy group content of 0.1 to 15 meq/g.

3. The pneumatic tire of claim 1, wherein the epoxidized polyisoprene has an epoxy group content of 0.3 to 10 meq/g.

4. The pneumatic tire of claim 1, wherein the epoxidized polyisoprene is present in a concentration of 5 to 15 phr.

5. The pneumatic tire of claim 1, wherein the epoxidized polyisoprene has a number-average molecular weight of 20000 to 40000.

6. The pneumatic tire of claim 1, wherein the amount of polybenzobisoxazole fiber ranges from 5 to 15 phr.

7. The pneumatic tire of claim 1, wherein the chipper is disposed with the short fibers substantially oriented in an angle ranging from 0 to 90 degrees with respect to the radial direction of the tire.

8. The pneumatic tire of claim 1, wherein the chipper is disposed with the short fibers substantially oriented in an angle ranging from 0 to 45 degrees with respect to the radial direction of the tire.

9. The pneumatic tire of claim 1, wherein the chipper is disposed with the short fibers substantially oriented in an angle ranging from 0 to 20 degrees with respect to the radial direction of the tire.

10. The pneumatic tire of claim 1, wherein the chipper is disposed with the short fibers substantially oriented in an angle ranging from 0 to 10 degrees with respect to the radial direction of the tire.

* * * * *